(12) United States Patent
Zhang

(10) Patent No.: US 9,203,959 B2
(45) Date of Patent: Dec. 1, 2015

(54) COMMUNICATION TERMINAL APPARATUS AND CALL-INITIATION SUPPRESSION METHOD

(71) Applicant: FUJITSU LIMITED, Kawasaki-shi, Kanagawa (JP)

(72) Inventor: Yue Zhang, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/251,225

(22) Filed: Apr. 11, 2014

(65) Prior Publication Data

US 2014/0348314 A1    Nov. 27, 2014

(30) Foreign Application Priority Data

May 23, 2013    (JP) ................................. 2013-108764

(51) Int. Cl.
```
H04M 15/06    (2006.01)
H04M 3/42     (2006.01)
H04M 3/424    (2006.01)
```
(52) U.S. Cl.
CPC .......... *H04M 3/42195* (2013.01); *H04M 3/424* (2013.01); *H04M 3/42025* (2013.01)

(58) Field of Classification Search
CPC ..................... H04M 3/42195; H04M 3/42025; H04M 3/424

USPC ........................... 379/142.06, 207.08, 210.02
See application file for complete search history.

(56) References Cited

U.S. PATENT DOCUMENTS

| | | | |
|---|---|---|---|
| 8,649,489 B2 * | 2/2014 | Mornhineway et al. | 379/142.06 |
| 2003/0210771 A1 * | 11/2003 | Broussard et al. | 379/88.23 |
| 2005/0026600 A1 * | 2/2005 | Hymel | 455/417 |
| 2014/0095596 A1 * | 4/2014 | Singh | 709/204 |

FOREIGN PATENT DOCUMENTS

| | | | |
|---|---|---|---|
| JP | 2005-130029 A | 5/2005 | |
| JP | 2008-067097 A | 3/2008 | |

* cited by examiner

*Primary Examiner* — Creighton Smith
(74) *Attorney, Agent, or Firm* — Maschoff Brennan

(57) ABSTRACT

A communication terminal apparatus includes a memory, and a processor coupled to the memory, configured to when an incoming-call notice is received, determine whether or not, among calls that have been initiated and that have failed to be answered, a call for which a number of a call reception destination matches a number of a call initiation source included in the incoming-call notice and for which a time related to initiation of the call and a time related to the incoming-call notice have a given relationship therebetween has been initiated, and when the call has been initiated, cause the communication terminal apparatus or a communication terminal apparatus that is the call reception destination to output information indicating suppression of initiation of a call.

12 Claims, 6 Drawing Sheets

COMMUNICATION TERMINAL APPARATUS AND CALL-INITIATION SUPPRESSION METHOD

CROSS-REFERENCE TO RELATED APPLICATION

This application is based upon and claims the benefit of priority of the prior Japanese Patent Application No. 2013-108764, filed on May 23, 2013, the entire contents of which are incorporated herein by reference.

FIELD

The embodiments discussed herein are related to a communication terminal apparatus, a call-initiation suppression method, and a storage medium storing a call-initiation suppression program.

BACKGROUND

When two communication terminal apparatuses initiate calls almost simultaneously so that each of the communication terminal apparatuses will initiate a call to the other communication terminal apparatus as a call reception destination, for the initiation of calls from both of the communication terminal apparatuses, the calls fail to be answered by the call reception destinations in some cases. In such a case, if a user of one of the communication terminal apparatuses waits for an incoming call from the other communication terminal apparatus and a user of the other communication terminal apparatus initiates the call, it is possible to smoothly start a telephone call. This is disclosed in, for example, Japanese Laid-open Patent Publication No. 2005-130029.

SUMMARY

According to an aspect of the invention, a communication terminal apparatus includes a memory, and a processor coupled to the memory, configured to when an incoming-call notice is received, determine whether or not, among calls that have been initiated and that have failed to be answered, a call for which a number of a call reception destination matches a number of a call initiation source included in the incoming-call notice and for which a time related to initiation of the call and a time related to the incoming-call notice have a given relationship therebetween has been initiated, and when the call has been initiated, cause the communication terminal apparatus or a communication terminal apparatus that is the call reception destination to output information indicating suppression of initiation of a call.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the related art, in normal cases, two users are present at places distant from each other. Thus, it is difficult to communicate with each other. Accordingly, there is a possibility that communication terminal apparatuses of both of the users will initiate calls simultaneously again and the calls will repeatedly fail to be answered.

Figure 1:
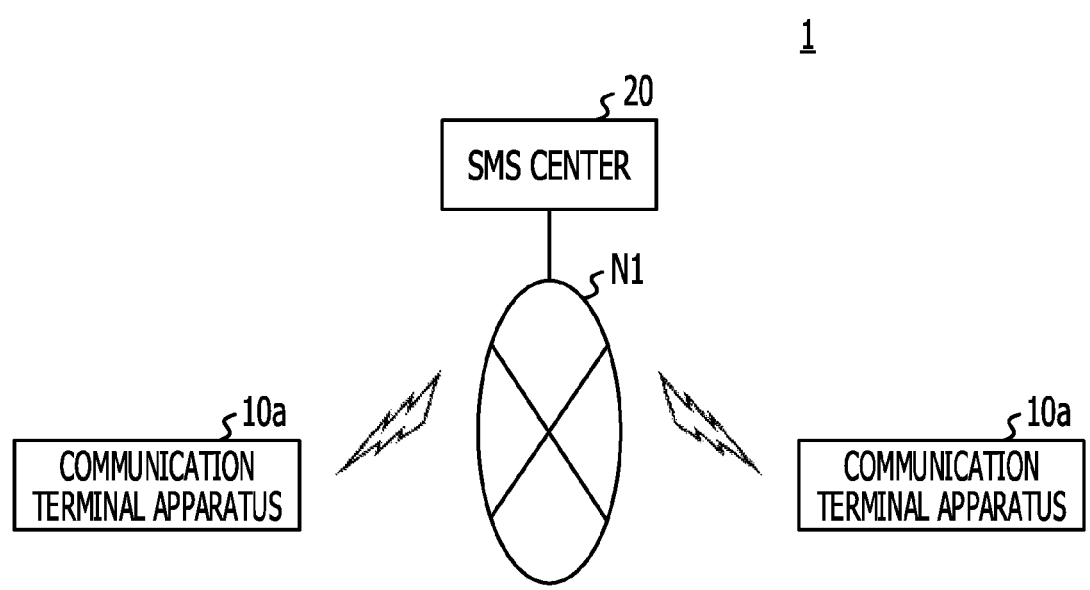
FIG. 1 is a diagram illustrating an example of a configuration of a communication system in a present embodiment.

Hereinafter, embodiments will be described with reference to the drawings. FIG. 1 is a diagram illustrating an example of a configuration of a communication system in a present embodiment.

In a communication system 1 illustrated in FIG. 1, a communication terminal apparatus 10a and a communication terminal apparatus 10b are capable of communicating with each other via a telephone communication network N1 or the like. Hereinafter, when the communication terminal apparatus 10a and the communication terminal apparatus 10b are not distinguished from each other, the communication terminal apparatus 10a and the communication terminal apparatus 10b are simply referred to as communication terminal apparatuses 10. Each of the communication terminal apparatuses 10 or one of the communication terminal apparatuses 10 may be connected to the telephone communication network N1 in a wired manner. In the present embodiment, each of the communication terminal apparatus 10a and the communication terminal apparatus 10b sets the other communication terminal apparatus 10 as a communication partner. Examples of the communication terminal apparatuses 10 include mobile phones (feature phones), smartphones, and tablet-type terminals. Furthermore, communication apparatuses such as landline telephones may be utilized as the communication terminal apparatuses 10.

The telephone communication network N1 includes not only telephone lines but also devices such as switchboards. A short message service (SMS) center 20 is connected to the telephone communication network N1. The SMS center 20 is a computer system that provides an SMS. In the present embodiment, the SMS center 20 transmits an incoming-call notice to each of the communication terminal apparatuses 10. The incoming-call notice is also called as an unreceived incoming-call notice, and is a message notifying a user that an incoming call has not been received. The incoming-call notice includes, for example, a telephone number of a call initiation source and an incoming time of the call. A failure in receiving a call occurs when the state of the communication terminal apparatus 10 is, for example, a state of being turned off, a state of initiating a call, a state of receiving a call, or a state of being during a call.

Figure 2:
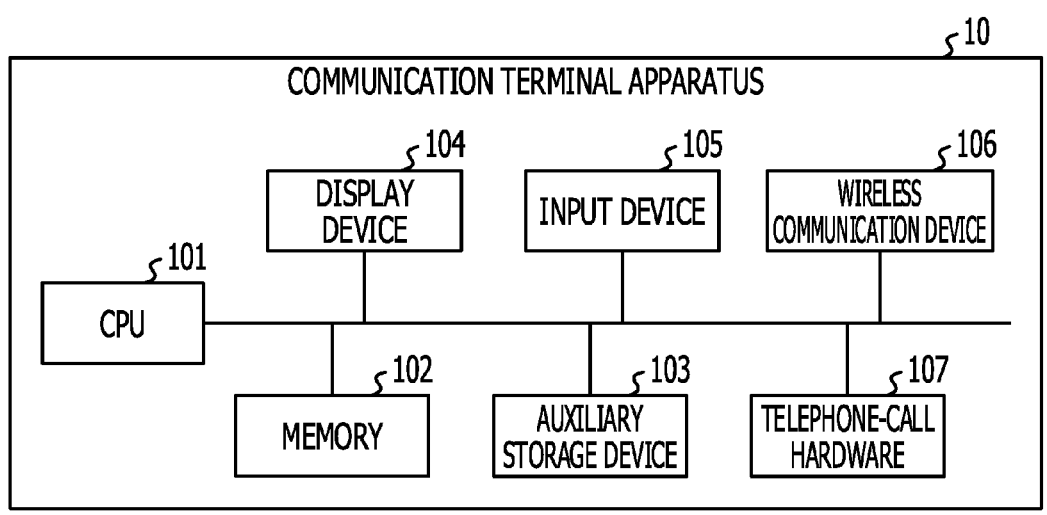
FIG. 2 is a diagram illustrating an example of a hardware configuration of each of communication terminal devices in the present embodiment.

FIG. 2 is a diagram illustrating an example of a hardware configuration of each of the communication terminal apparatuses in the present embodiment. Referring to FIG. 2, the communication terminal apparatus 10 includes, for example, a central processing unit (CPU) 101, a memory 102, an auxiliary storage device 103, a display device 104, an input device 105, a wireless communication device 106, and a telephone-call hardware 107.

The auxiliary storage device 103 stores, for example, a program installed in the communication terminal apparatus 10. When an instruction to activate the program is provided, the memory 102 loads the program from the auxiliary storage device 103, and stores the program. The CPU 101 realizes functions of the communication terminal apparatus 10 in accordance with the program stored in the memory 102.

The display device 104 is, for example, a liquid-crystal display. The input device 105 is, for example, a button, and accepts an input from a user. Note that the display device 104 and the input device 105 may configure a touch panel. In this case, the input device 105 may be an electronic component that includes a sensor which detects a contact operation performed by a contact object such as one of the fingers of the user.

The wireless communication device 106 is an electronic component, such as an antenna, that is desirable in order to perform communication in a wireless local area network (LAN), a mobile communication network, or the like. The telephone-call hardware 107 is a set of various types of hardware utilized in a telephone call, such as a microphone and a speaker.

Figure 3:
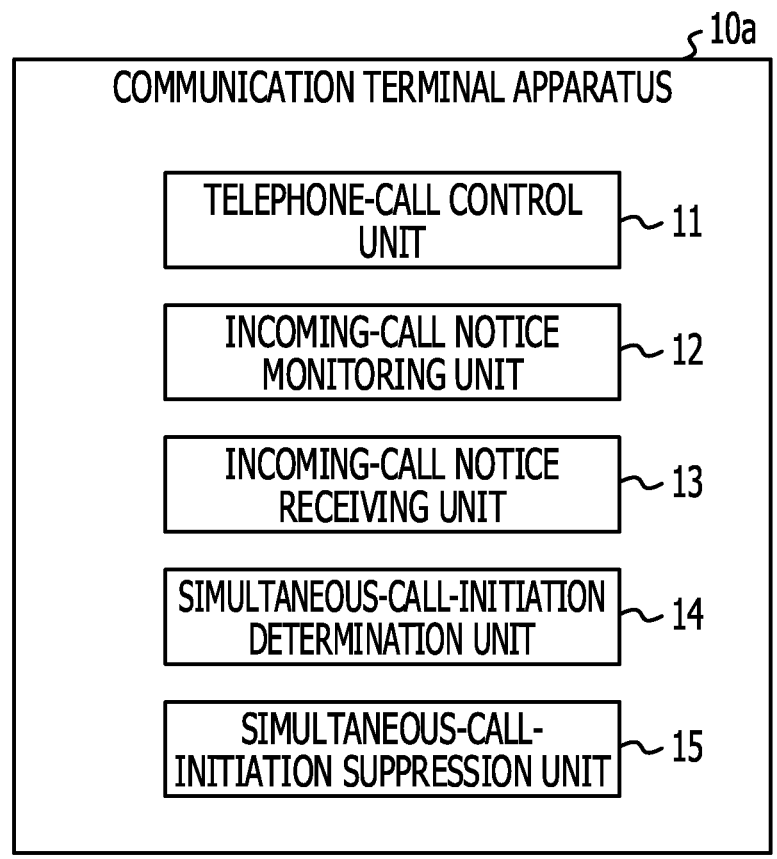
FIG. 3 is a diagram illustrating an example of a functional configuration of one of the two communication terminal devices in the present embodiment.

FIG. 3 is a diagram illustrating an example of a functional configuration of one of the communication terminal apparatuses in the present embodiment. Referring to FIG. 3, the communication terminal apparatus 10a includes, for example, a telephone-call control unit 11, an incoming-call notice monitoring unit 12, an incoming-call notice receiving unit 13, a simultaneous-call-initiation determination unit 14, and a simultaneous-call-initiation suppression unit 15. For example, the program stored in the auxiliary storage device 103 causes the CPU 101 to perform processes, and, consequently, the individual units are realized by the processes.

The telephone-call control unit 11 performs control concerning a telephone call utilizing a telephone line, such as initiation of a call or reception of a call. The incoming-call notice monitoring unit 12 monitors reception of an incoming-call notice. The incoming-call notice receiving unit 13 receives an incoming-call notice. The simultaneous-call-initiation determination unit 14 determines, based on information concerning initiation of a call in the past that failed to be answered by a call reception destination and information included in the incoming-call notice, whether or not simultaneous call initiation has occurred. In the present embodiment, the expression "simultaneous call initiation" implies that the two communication terminal apparatuses 10 initiate calls almost simultaneously so that each of the communication terminal apparatuses 10 will initiate a call to the other communication terminal apparatus 10 as a call reception destination. When simultaneous call initiation occurs, each of both of the communication terminal apparatuses 10 fails to cause the other communication terminal apparatus 10 to answer the call, and both of the communication terminal apparatuses 10 receive incoming-call notices in some cases.

When it is determined by the simultaneous-call-initiation determination unit 14 that simultaneous call initiation has occurred, the simultaneous-call-initiation suppression unit 15 controls a process of suppressing occurrence of simultaneous call initiation again. For example, the simultaneous-call-initiation suppression unit 15 performs a process of causing the communication terminal apparatus 10a or the communication terminal apparatus 10b to output information indicating suppression of simultaneous call initiation.

Hereinafter, a procedure of a process performed by the communication terminal apparatus 10a will be described. In the present embodiment, a situation in which simultaneous call initiation has occurred between the communication terminal apparatus 10a and the communication terminal apparatus 10b is assumed. First, an overview of a process of providing incoming-call notices in response to simultaneous call initiation will be described.

Figure 4:
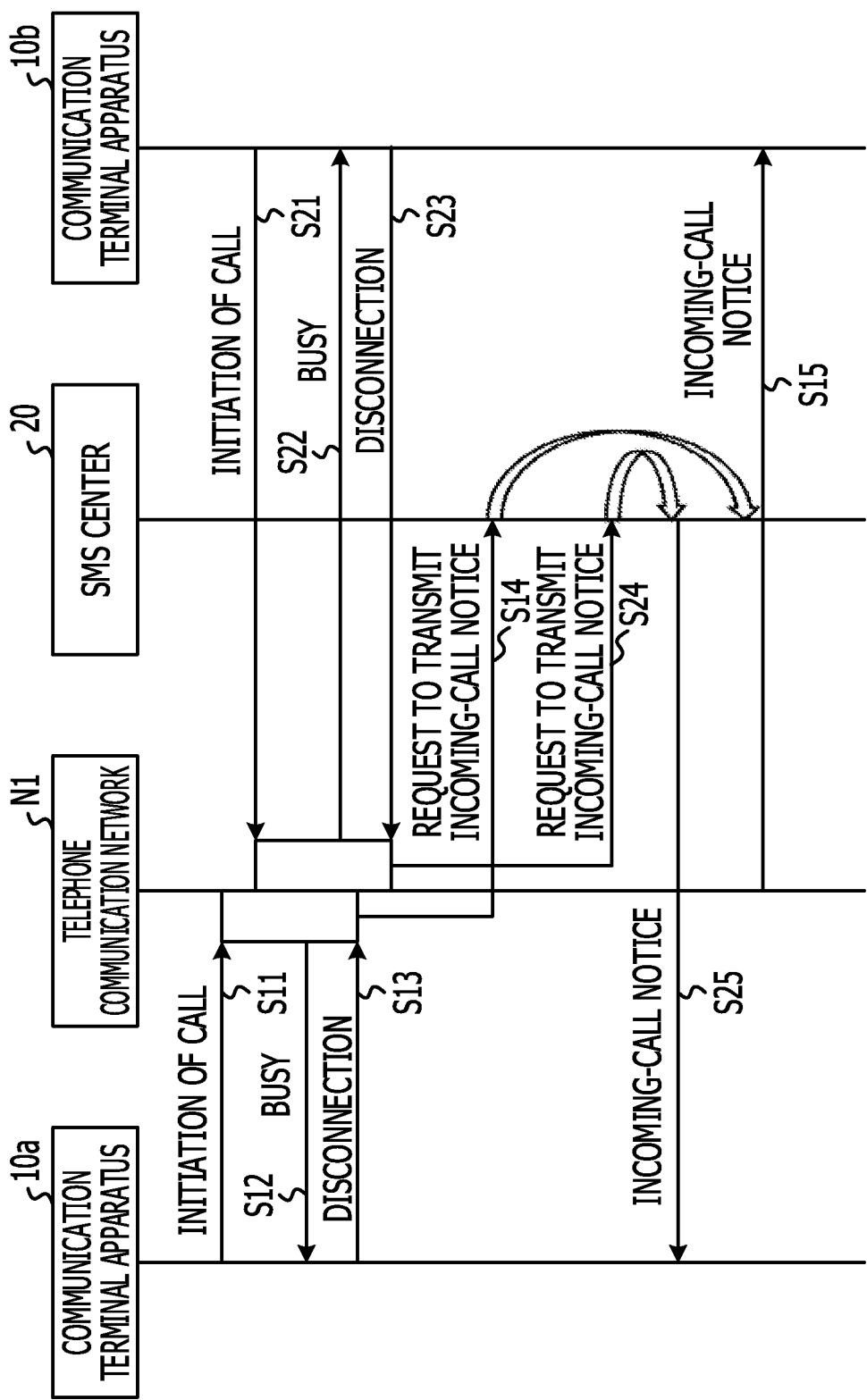
FIG. 4 is a sequence diagram for explaining an example of a procedure of a process performed in the case of providing incoming-call notices in response to simultaneous call initiation.

FIG. 4 is a sequence diagram for explaining an example of a procedure of a process performed in the case of providing incoming-call notices in response to simultaneous call initiation.

For example, the communication terminal apparatus 10a initiates a call to the telephone number of the communication terminal apparatus 10b as a call reception destination (step S11), the state of the communication terminal apparatus 10b is checked in the telephone communication network N1. For a time period taken until whether the communication terminal apparatus 10b is present in the telephone communication network N1 is determined, a call to the telephone number of the communication terminal apparatus 10a as a call reception destination is initiated by the communication terminal apparatus 10b (step S21), the state of the communication terminal apparatus 10b is checked in response to initiation of a call from the communication terminal apparatus 10a, and it is determined that the communication terminal apparatus 10b is in a busy state (a state of being during a call). As a result, the call has failed to be answered by the communication terminal apparatus 10b. Then, a signal indicating that the communication terminal apparatus 10b is in the busy state is returned from the telephone communication network N1 to the communication terminal apparatus 10a (step S12). The communication terminal apparatus 10a finishes, in accordance with an operation performed by the user, initiating a call (step S13).

Similarly, in the case where the state of communication terminal apparatus 10a is checked in response to initiation of a call from the communication terminal apparatus 10b, it is determined that the communication terminal apparatus 10a is in the busy state. As a result, the call has failed to be answered by the communication terminal apparatus 10a. Then, a signal indicating that the communication terminal apparatus 10a is in the busy state is returned from the telephone communication network N1 to the communication terminal apparatus 10b (step S22). The communication terminal apparatus 10b finishes, in accordance with an operation performed by the user, initiating a call (step S23).

The telephone communication network N1 requests the SMS center 20 to transmit an incoming-call notice for a failure in answering the call by the communication terminal apparatus 10b because the communication terminal apparatus 10b is in the busy state, that is, for a failure in receiving the call by the communication terminal apparatus 10b (step S14). Furthermore, the telephone communication network N1 requests the SMS center 20 to transmit an incoming-call notice for a failure in answering the call by the communication terminal apparatus 10a because the communication terminal apparatus 10a is in the busy state, that is, for a failure in receiving the call by the communication terminal apparatus 10a (step S24). The SMS center 20 transmits the requested incoming-call notices to the communication terminal apparatus 10a and the communication terminal apparatus 10b (steps S15 and S25).

In this manner, in the case of simultaneous call initiation, incoming-call notices are transmitted to both of the communication terminal apparatuses 10.

Figure 5:
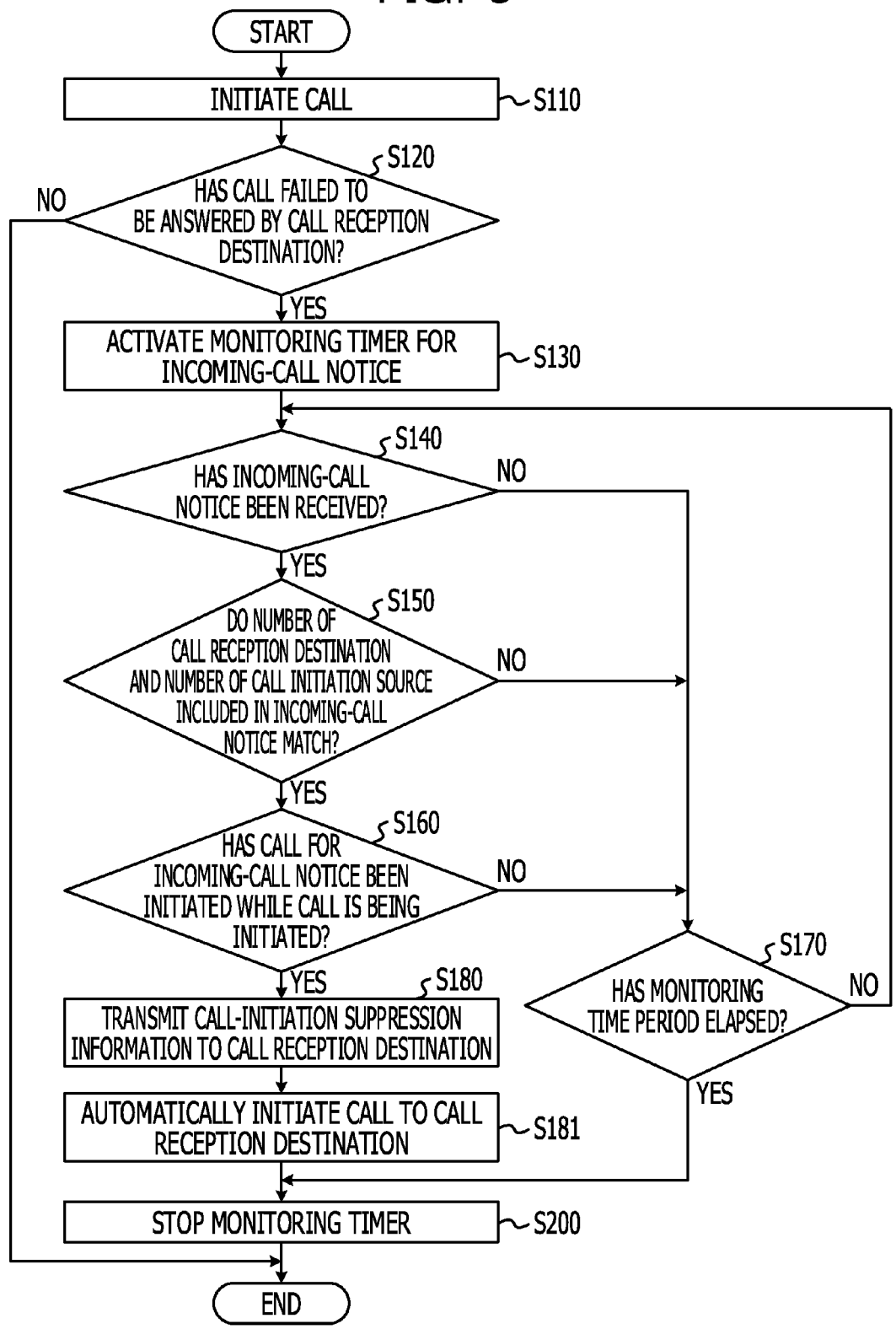
FIG. 5 is a flowchart for explaining an example of a procedure of a simultaneous-call-initiation suppression process in a first embodiment.

Then, a procedure of a process performed by the communication terminal apparatus 10a that is one of the communication terminal apparatuses 10 will be described. FIG. 5 is a flowchart for explaining an example of a procedure of a simultaneous-call-initiation suppression process in a first embodiment.

In step S110, the telephone-call control unit 11 of the communication terminal apparatus 10a initiates a call to a telephone number specified by the user as a call reception destination. When an incoming call made by the initiation of a call is received (NO in step S120), a telephone call is established between the communication terminal apparatus 10a and the communication terminal apparatus 10b that is the call reception destination is performed.

In contrast, when the call has failed to be answered by the call reception destination (YES in step S120), the simultaneous-call-initiation suppression process is performed in step S130 and steps thereafter. Note that a failure in answering the call by the call reception destination indicates a state in which, for the initiation of a call in step S110 (hereinafter, referred to as "initiation of an answering failure call"), the call has not been able to be received because the call reception destination is turned off, is initiating a call, is receiving a call, is during a call, or the like.

In step S130, the incoming-call notice monitoring unit 12 activates a timer (hereinafter, referred to as a "monitoring timer") that is used to measure a monitoring time period which is taken until an incoming-call notice is received. Next, the incoming-call notice monitoring unit 12 determines whether or not an incoming-call notice has been received by the incoming-call notice receiving unit 13 (step S140). The incoming-call notice receiving unit 13 waits for reception of an incoming-call notice until the value of the monitoring timer reaches a predetermined time period that is set in advance (step S170). In the case where an incoming-call notice has not been received even when the value of the monitoring timer has reached the predetermined time period (YES in step S170), the incoming-call notice monitoring unit 12 stops the monitoring timer (step S200), and finishes the simultaneous-call-initiation suppression process.

When an incoming-call notice has been received by the incoming-call notice receiving unit 13 within the predetermined time period (YES in step S140), the simultaneous-call-initiation determination unit 14 compares the telephone number (hereinafter, referred to as a "call-reception-destination number") of the call reception destination for the initiation of the answering failure call and the telephone number (hereinafter, referred to as a "call-initiation-source number") of a call initiation source that is included in the incoming-call notice (step S150). In the case where the call-reception-destination number and the call-initiation-source number do not match (NO in step S150), when the value of the monitoring timer has not reached the predetermined time period (NO in step S170), the incoming-call notice receiving unit 13 continues waiting for an incoming-call notice.

When the call-reception-destination number and the call-initiation-source number match (YES in step S150), the simultaneous-call-initiation determination unit 14 determines whether or not a call initiated by the call initiation source for the incoming-call notice is a call that has been initiated while the answering failure call is being initiated (step S160). The determination is performed by determining whether or not an incoming time included in the incoming-call notice or a time at which the incoming-call notice was received and a time related to the initiation of the answering failure call satisfy a given relationship (or condition) therebetween. For example, whether or not the incoming time included in the incoming-call notice is a time within a time period from the start of the initiation of the answering failure call to the end of the initiation of the answering failure call may be determined. Alternatively, whether or not the incoming time included in the incoming-call notice or the time at which the incoming-call notice was received is a time within a predetermined time period from a time at which initiation of the call started may be determined.

Note that, for example, in step S110, the telephone-call control unit 11 may store, in the memory 102, the telephone number of the call reception destination for the initiation of the answering failure call, a time related to the initiation of the call, and so forth. In other words, every time a call is initiated, the telephone-call control unit 11 may store, in the memory 102, the telephone number of a call reception destination for the initiation of the call, a time related to the initiation of the call, and so forth. Alternatively, the telephone number of the call reception destination for the initiation of the answering failure call, a time related to the initiation of the call, and so forth may be acquired from a call initiation history stored in the auxiliary storage device 103.

In the case where it is determined that a call initiated by the call initiation source for the incoming-call notice is not a call that has been initiated while the answering failure call is being initiated (NO in step S160), when the value of the monitoring timer has not reached the predetermined time period (NO in step S170), the incoming-call notice receiving unit 13 continues waiting for an incoming-call notice.

When it is determined that a call initiated by the call initiation source for the incoming-call notice is a call that has been initiated while the answering failure call is being initiated (YES in step S160), the simultaneous-call-initiation determination unit 14 determines that simultaneous call initiation has occurred. Then, the simultaneous-call-initiation suppression unit 15 transmits, to the call reception destination for the initiation of the answering failure call, information (hereinafter, referred to as "call-initiation suppression information") that indicates suppression of initiation of a call (step S180). The call-initiation suppression information may be, for example, a message "please wait for a while because I will call you back". This message may be transmitted, for example, utilizing the SMS, or may be transmitted by electronic mail. In the case of transmitting the message by electronic mail, a mail address that corresponds to the call reception destination for the initiation of the answering failure call may be acquired from, for example, an address book stored in the auxiliary storage device 103. In the address book, mail addresses and telephone numbers are associated with each other.

Next, the telephone-call control unit 11 automatically initiates a call to the telephone number of the call reception destination for the initiation of the answering failure call (step S181).

Here, it is possible to expect that initiation of a call again by the user of the communication terminal apparatus 10b which is the call reception destination will be suppressed by the call-initiation suppression information that has been transmitted to the call reception destination in step S180. Accordingly, it is possible to expect that a call which has been automatically initiated in step S181 will be received by the communication terminal apparatus 10b which is the call reception destination. In other words, it is possible to expect that, without occurrence of simultaneous call initiation again, a telephone call will be established quickly.

Next, the incoming-call notice monitoring unit 12 stops the monitoring timer (step S200), and finishes the simultaneous-call-initiation suppression process.

Note that, when the call-initiation suppression information is transmitted by SMS or electronic mail, it is desirable that the user of the call reception destination view the call-initiation suppression information by operating the communication terminal apparatus 10*b*. In this case, there is a possibility that the user will postpone viewing the call-initiation suppression information and repeat initiation of a call. For this reason, in the call-initiation suppression information, a command that is interpretable by the communication terminal apparatus 10*b* which is the call reception destination may be included. The communication terminal apparatus 10*b* that has received the command may cause the display device to forcibly display a message (for example, "because the person that you called also calls you back, will you wait for a while?") included in the call-initiation suppression information, or may provide the message as an audio output.

As described above, according to the first embodiment, the communication terminal apparatus 10*a* is capable of automatically detecting occurrence of simultaneous call initiation, and is capable of, in response to detection of occurrence of simultaneous call initiation, prompting a call reception destination to suppress simultaneous call initiation. As a result, it is possible to increase the possibility that the disadvantage that simultaneous call initiation is repeated will not occur.

Next, a second embodiment will be described. In the second embodiment, the differences from the first embodiment will be described. Accordingly, portions that are not mentioned particularly may be the same as the portions in the first embodiment.

Figure 6:
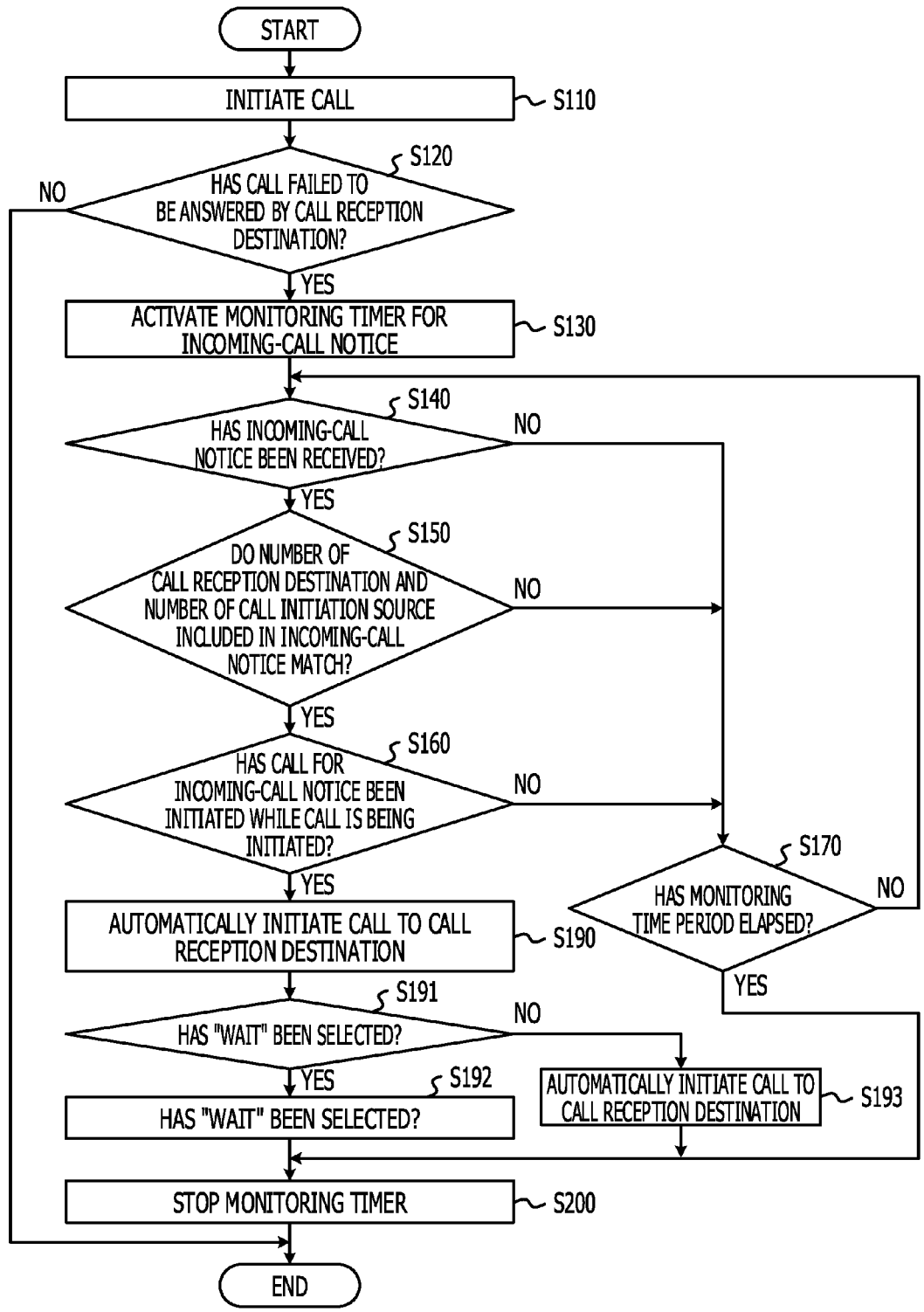
FIG. 6 is a flowchart for explaining an example of a procedure of the simultaneous-call-initiation suppression process in a second embodiment.

FIG. 6 is a flowchart for explaining an example of a procedure of the simultaneous-call-initiation suppression process in the second embodiment. In FIG. 6, steps that are the same as steps illustrated in FIG. 5 are denoted by the same step numbers, and a description thereof is omitted. Referring to FIG. 6, instead of steps S180 and S181, steps S190 to S193 are performed.

When it is determined by the simultaneous-call-initiation determination unit 14 that simultaneous call initiation has occurred (YES in step S160), the simultaneous-call-initiation suppression unit 15 causes the display device 104 of the communication terminal apparatus 10*a* to display the simultaneous-call-initiation suppression information (step S190). Here, the simultaneous-call-initiation suppression information is, for example, a screen that includes a message "because the person that you called also calls you back, will you wait for a while?" and a button which is used to cause the user to select "wait" or "initiation of a call again".

When "wait" is selected by the user of the communication terminal apparatus 10*a* (YES in step S191), the simultaneous-call-initiation suppression unit 15 transmits, to the call reception destination for the initiation of the answering failure call, information (hereinafter, referred to as "call-initiation prompting information") indicating that it is prompted to initiate a call (step S192). The call-initiation prompting information may be, for example, a message "I'm waiting for your call, please call me back." This message may be transmitted, for example, utilizing the SMS, or may be transmitted by electronic mail. It is possible to expect that a call to the communication terminal apparatus 10*a* will be initiated again by the user of the communication terminal apparatus 10*b* which is the call reception destination in response to transmission of the call-initiation prompting information. Here, the user of the communication terminal apparatus 10*a* selects "wait". Accordingly, it is possible to expect that, without occurrence of simultaneous call initiation again, a telephone call will be established quickly.

In contrast, when "initiation of a call" is selected by the user of the communication terminal apparatus 10*a* (NO in step S191), the telephone-call control unit 11 automatically initiates a call to the telephone number of the call reception destination for the initiation of the answering failure call (step S193). Note that, before step S193 is performed, step S180 illustrated in FIG. 5 may be performed. In other words, the call-initiation suppression information may be transmitted to the call reception destination.

Note that, when the call-initiation prompting information is transmitted by SMS or electronic mail, it is desirable that the user of the call reception destination view the call-initiation prompting information by operating the communication terminal apparatus 10*a*. In this case, there is a possibility that the user will keep from initiating a call without viewing the call-initiation prompting information. As a result, there is a possibility that both of the communication terminal apparatus 10*a* and the communication terminal apparatus 10*b* will not initiate calls, and it will take a time until a telephone call is established. For this reason, in the call-initiation prompting information, a command that is interpretable by the communication terminal apparatus 10*b* which is the call reception destination may be included. The communication terminal apparatus 10*b* that has received the command may automatically initiate a call to the communication terminal apparatus 10*a* as a call reception destination.

In each of the foregoing embodiments, in the case where the communication terminal apparatus 10*b* has a functional configuration (see FIG. 3) that is the same as that of the communication terminal apparatus 10*a*, there is a possibility that each of the communication terminal apparatuses 10 will transmit the call-initiation suppression information or the call-initiation prompting information to the other communication terminal apparatus 10. In this case, there is a possibility that simultaneous call initiation will be repeated or each of the communication terminal apparatuses will keep from initiating a call to the other communication terminal apparatus 10, and, consequently, it will take a time until a telephone call is established.

For this reason, in the case where each of the communication terminal apparatuses 10 has the functional configuration illustrated in FIG. 3, the simultaneous-call-initiation suppression unit 15 of each of the communication terminal apparatuses 10 may compare, for example, the telephone number of a call initiation source that is included in an incoming-call notice and the telephone number of the communication terminal apparatus 10*a*. In accordance with a result of comparison, the simultaneous-call-initiation suppression unit 15 may select whether or not the call-initiation suppression information or the call-initiation prompting information is to be transmitted. For example, the simultaneous-call-initiation suppression unit 15 may treat the telephone numbers of both of the communication terminal apparatuses 10 as simple numbers, and may select, based on the magnitude relationship therebetween, whether or not the call-initiation suppression information or the call-initiation prompting information is to be transmitted. More specifically, in the first embodiment, in the case where the telephone number of the communication terminal apparatus 10*a* is the smaller value, the simultaneous-call-initiation suppression unit 15 of the communication terminal apparatus 10*a* transmits the call-initiation suppression information (step S180), and automatically initiates a call (step S181). In the case where the telephone number of the communication terminal apparatus 10*a* is the larger value, the simultaneous-call-initiation suppression unit 15 of the communication terminal apparatus 10*a* does not transmit the call-initiation suppression information (step S180), and does not automatically initiate a call (step S181). In this case, in the case where the telephone number of the communication terminal apparatus 10a is the smaller value, the simultaneous-call-initiation suppression unit 15 of the communication terminal apparatus 10b does not transmit the call-initiation suppression information (step S180), and does not automatically initiate a call (step S181). Furthermore, in the case where the telephone number of the communication terminal apparatus 10a is the larger value, the simultaneous-call-initiation suppression unit 15 of the communication terminal apparatus 10b transmits the call-initiation suppression information (step S180), and automatically initiates a call (step S181). Accordingly, it is possible to reduce the possibility that the operations of both of the communication terminal apparatuses 10 will be duplicated.

Furthermore, in the second embodiment, in the case where the telephone number of the communication terminal apparatus 10a is the smaller value, in step S190, the simultaneous-call-initiation suppression unit 15 displays a screen indicating that a call is to be initiated again, and automatically initiates a call again (step S193). In the case where the telephone number of the communication terminal apparatus 10a is the larger value, in step S190, the simultaneous-call-initiation suppression unit 15 displays a screen indicating that it is prompted to wait, and transmits the call-initiation prompting information (step S192). In this case, in the case where the telephone number of the communication terminal apparatus 10a is the smaller value, in step S190, the simultaneous-call-initiation suppression unit 15 of the communication terminal apparatus 10b displays a screen indicating that it is prompted to wait, and transmits the call-initiation prompting information (step S192). In the case where the telephone number of the communication terminal apparatus 10a is the larger value, in step S190, the simultaneous-call-initiation suppression unit 15 of the communication terminal apparatus 10b displays a screen indicating that a call is to be initiated again, and automatically initiates a call again. Accordingly, it is possible to the possibility that the operations of both of the communication terminal apparatuses 10 will be duplicated.

Note that, in each of the foregoing embodiments, an example is described, in which the simultaneous-call-initiation suppression process starts in response to a failure in answering a call by a call reception destination. However, the start of the simultaneous-call-initiation suppression process may be triggered by receiving an incoming-call notice. In this case, activation of the monitoring timer, monitoring with the monitoring timer, stop of the monitoring timer, and so forth may be not necessarily performed.

Note that, in each of the foregoing embodiments, the simultaneous-call-initiation determination unit 14 is an example of a determination unit. The simultaneous-call-initiation suppression unit 15 is an example of a suppression unit. The telephone-call control unit 11 is an example of a call initiation unit. The display device 104 is an example of a display unit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication terminal apparatus comprising:
a memory; and
a processor coupled to the memory, the processor configured to:
when an incoming-call notice is received, determine whether or not a number of the call initiation source matches a number of a call reception destination among calls that have been initiated and that have failed to be answered when a time related to initiation of the call and a time related to the incoming-call notice have a given relationship therebetween, and
when the call has been initiated, cause the communication terminal apparatus or a communication terminal apparatus that is the call reception destination to output information indicating suppression of initiation of a call.

2. The communication terminal apparatus according to claim 1,
wherein the processor is configured to transmit the information indicating suppression of initiation of a call to a communication terminal apparatus that is the call reception destination, and
automatically initiate a call to the call reception destination when the information is transmitted.

3. The communication terminal apparatus according to claim 1,
wherein the processor is further configured to:
display, on a display of the communication terminal apparatus, the information indicating suppression of initiation of a call, and
transmit, to a communication terminal apparatus that is the call reception destination, information prompting the communication terminal apparatus that is the call reception destination to initiate a call to the communication terminal apparatus.

4. The communication terminal apparatus according to claim 1,
wherein, based on comparison between the number of the call initiation source included in the incoming-call notice and the number of the communication terminal apparatus, the processor is configured to select the communication terminal apparatus or a communication terminal apparatus that is the call reception destination as a destination to output the information indicating suppression of initiation of a call.

5. A call-initiation suppression method for a communication terminal apparatus, the method comprising:
determining, when an incoming-call notice is received, whether or not a number of the call initiation source matches a number of a call reception destination among calls that have been initiated and that have failed to be answered; and
causing, when the call has been initiated, the communication terminal apparatus or a communication terminal apparatus that is the call reception destination to output information indicating suppression of initiation of a call.

6. The call-initiation suppression method according to claim 5,
wherein, the information indicating suppression of initiation of a call is transmitted to a communication terminal apparatus that is the call reception destination, and
wherein the call-initiation suppression method further comprises automatically initiating a call to the call reception destination from the communication terminal apparatus when the information is transmitted.

7. The call-initiation suppression method according to claim 5,
wherein the information indicating suppression of initiation of a call is displayed on a display of the communication terminal apparatus, and information prompting a communication terminal apparatus that is the call reception destination to initiate a call to the communication terminal apparatus is transmitted to the communication terminal apparatus that is the call reception destination.

8. The call-initiation suppression method according to claim 5,
Wherein-based on comparison between the number of the call initiation source included in the incoming-call notice and the number of the communication terminal apparatus, the communication terminal apparatus or a communication terminal apparatus that is the call reception destination is selected as a destination to which the information indicating suppression of initiation of a call is output.

9. A non-transitory machine readable medium storing a program that, when executed by a processor, causes the processor of a communication terminal apparatus to perform operations comprising:
determining, when an incoming-call notice is received, whether or not a number of the call initiation source matches a number of a call reception destination among calls that have been initiated and that have failed to be answered when a time related to initiation of the call and a time related to the incoming-call notice have a given relationship therebetween; and
causing, when the call has been initiated, the communication terminal apparatus or a communication terminal apparatus that is the call reception destination to output information indicating suppression of initiation of a call.

10. The non-transitory machine readable medium storing a program according to claim 9,
Wherein the information indicating suppression of initiation of a call is transmitted to a communication terminal apparatus that is the call reception destination, and
wherein the program further comprises automatically initiating a call to the call reception destination when the information is transmitted.

11. The non-transitory machine readable medium storing a program according to claim 9,
Wherein the information indicating suppression of initiation of a call is displayed on a display of the communication terminal apparatus, and information prompting a communication terminal apparatus that is the call reception destination to initiate a call to the communication terminal apparatus is transmitted to the communication terminal apparatus that is the call reception destination.

12. The non-transitory machine readable medium storing a program according to claim 9,
Wherein based on comparison between the number of the call initiation source included in the incoming-call notice and the number of the communication terminal apparatus, the communication terminal apparatus or a communication terminal apparatus that is the call reception destination is selected as a destination to which the information indicating suppression of initiation of a call is output.

* * * * *